(12) United States Patent
Hatta et al.

(10) Patent No.: US 7,975,759 B2
(45) Date of Patent: Jul. 12, 2011

(54) TEMPERATURE CONTROL METHOD, TEMPERATURE CONTROL APPARATUS AND HIGH/LOW TEMPERATURE PROCESSING SYSTEM

(75) Inventors: Masataka Hatta, Nirasaki (JP);
Yoshinao Kono, Nirasaki (JP);
Toshikazu Ariyama, Nirasaki (JP);
Kazuki Hosaka, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 691 days.

(21) Appl. No.: 11/857,042

(22) Filed: Sep. 18, 2007

(65) Prior Publication Data
US 2008/0257537 A1 Oct. 23, 2008

(30) Foreign Application Priority Data

Sep. 19, 2006 (JP) .................................. 2006-253490

(51) Int. Cl.
*F28D 5/00* (2006.01)
(52) U.S. Cl. ............. 165/104.32; 236/91 D; 62/331; 62/259.2
(58) Field of Classification Search ............. 236/91 D; 62/331, 259.2; 165/104.27, 104.32
See application file for complete search history.

(56) References Cited

U.S. PATENT DOCUMENTS

| | | | | |
|---|---|---|---|---|
| 3,989,102 | A | * | 11/1976 | Jaster et al. ............. 165/104.31 |
| 7,461,975 | B2 | * | 12/2008 | McCarthy, Jr. ............. 378/200 |
| 2005/0183432 | A1 | * | 8/2005 | Cowans et al. ............. 62/190 |
| 2006/0003688 | A1 | * | 1/2006 | Turner ............. 454/370 |

FOREIGN PATENT DOCUMENTS

JP 2004-197134 A 7/2004

OTHER PUBLICATIONS

"Molecular Aspects of Thermal Conductivity: Heat Transfer Basics." Snurr Research Group. Nov. 24, 2004. Web. Nov. 4, 2010. <http://zeolites.cqe.northwestern.edu/Module/heattrans.html>.*

* cited by examiner

*Primary Examiner* — Cheryl J Tyler
*Assistant Examiner* — Jonathan Bradford
(74) *Attorney, Agent, or Firm* — Oblon, Spivak, McClelland, Maier & Neustadt, L.L.P.

(57) ABSTRACT

A temperature control apparatus that controls a temperature of a target object by a heat exchange between a temperature control liquid and the target object. The apparatus includes a pressurizing unit that pressurizes the temperature control liquid to increase a boiling point thereof; a heating unit that increases a temperature of the temperature control liquid to become higher than or equal to a boiling point of the temperature control liquid observed at a normal pressure; and a heat exchanging unit that exchanges heat between the target object and the temperature control liquid whose temperature has been increased to become higher than or equal to the boiling point of the temperature control liquid observed at the normal pressure.

9 Claims, 4 Drawing Sheets

TEMPERATURE CONTROL METHOD, TEMPERATURE CONTROL APPARATUS AND HIGH/LOW TEMPERATURE PROCESSING SYSTEM

FIELD OF THE INVENTION

The present invention relates to a method and an apparatus for controlling a temperature of a target object, and a high/low temperature processing system; and, more particularly, to a temperature control method and apparatus and a high/low temperature processing system capable of, when processing a target object such as a semiconductor wafer, controlling a temperature thereof within a wide temperature range from a low temperature to a high temperature by using one kind of temperature control liquid such as a cooling liquid.

BACKGROUND OF THE INVENTION

When a specific process is performed on a target object such as a semiconductor wafer, heat is frequently generated from the target object. To perform a stable process on the target object, the heat is absorbed therefrom by using a cooling liquid, so that the process can be carried out while the temperature of the target object is maintained at a constant temperature. For example, an inspection device for inspecting, e.g., a semiconductor wafer (hereinafter, simply referred to as "wafer") having a plurality of devices formed thereon is required to perform an inspection while cooling the wafer, because heat is generated from each device of the wafer during the inspection. Further, in order to obtain reliability of the devices in a low and/or a high temperature range, the inspection of the wafer is carried out by the inspection device at a minus temperature and/or at a high temperature of, e.g., 100° C. or thereabout.

Figure 3:
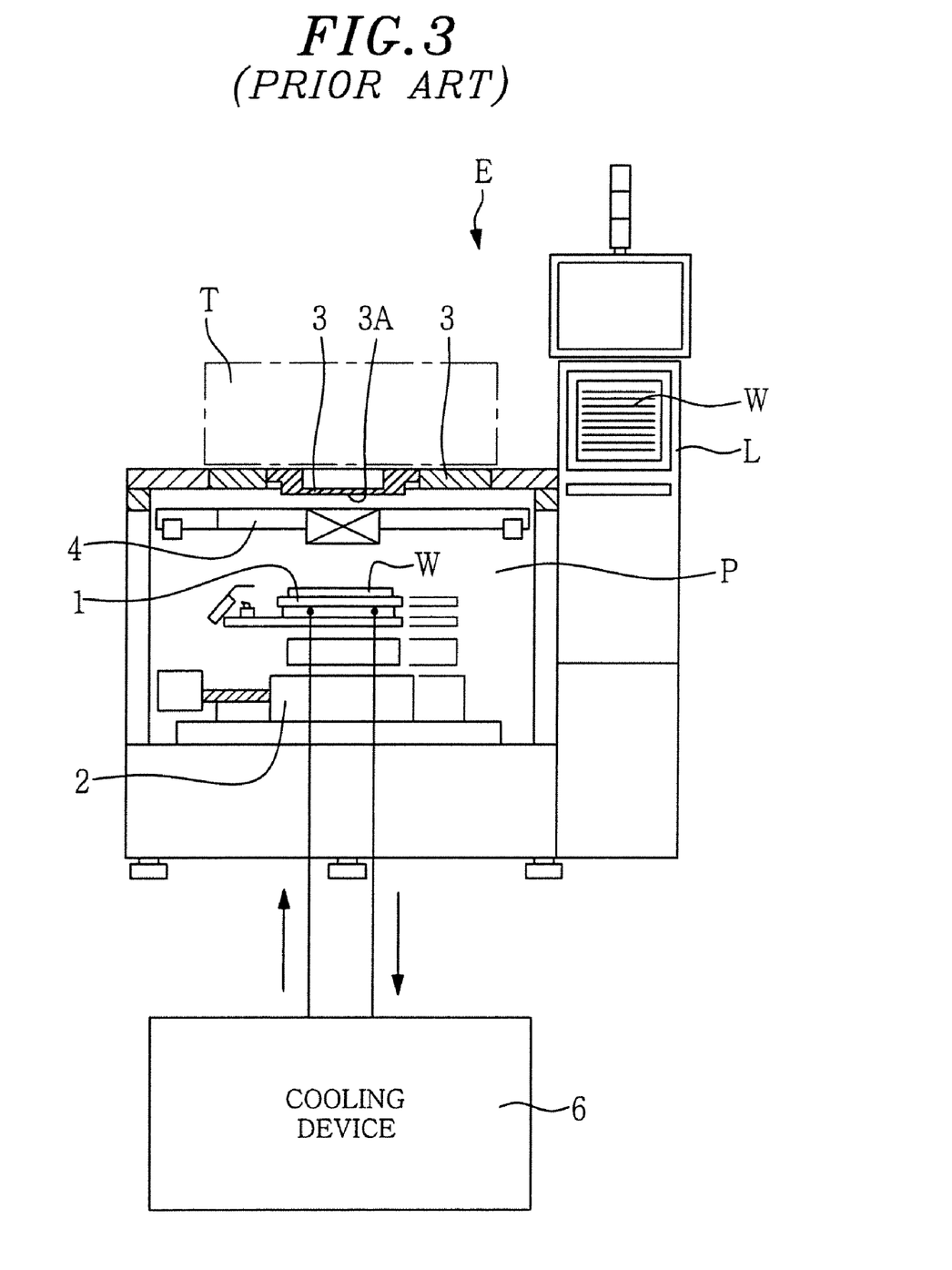
FIG. 3 depicts a cross sectional view of a conventional inspection device.

Now, a conventional inspection device will be described with reference to FIGS. 3 and 4. As shown in FIG. 3, the inspection device E includes, for example, a loader chamber L for transferring a wafer W; a prober chamber P for inspecting electrical characteristics of the wafer W transferred from the loader chamber L; and a controller (not shown). The inspection device E performs a high temperature inspection and a low temperature inspection of the wafer W under the control of the controller.

As illustrated in FIG. 3, the prober chamber P includes a temperature-controllable wafer chuck 1 for mounting thereon the wafer W in a vertically movable manner; an XY table which moves the wafer chuck 1 in X and Y directions; a probe card 3 disposed above the wafer chuck 1; and a position alignment mechanism 4 which enables a plurality of probes 3A of the probe card 3 to be precisely aligned to a plurality of electrode pads of the wafer W on the wafer chuck 1.

Furthermore, as shown in FIG. 3, a test head T of a tester is detachably placed on a head plate 5 of the prober chamber P, and is electrically connected with the probe card 3 via a performance board (not shown). The temperature of the wafer W on the wafer chuck 1 is set, e.g., within a temperature range from a low temperature to a high temperature, and inspection signals are sent to the probes 3A from the tester via the test head T and the performance board, whereby the electrical characteristics of the wafer W are inspected.

When performing the inspection of the electrical characteristics of the wafer W at the low temperature, the wafer W is cooled down to a specific temperature (e.g., −65° C.) in a low temperature range by a cooling jacket (not shown) embedded in the wafer chuck 1. However, when performing the inspection of the electrical characteristics of the wafer W at a high temperature, the wafer W is heated up to a certain temperature (e.g., several tens of degrees centigrade) in a high temperature range by a heating mechanism such as a heater embedded in the wafer chuck 1. Since heat is generated from the wafer W in both of the cases, a cooling liquid is circulated through the cooling jacket inside the wafer chuck 1 in order to absorb the heat from the wafer W so that the wafer W is maintained at a specific temperature level.

Figure 4:
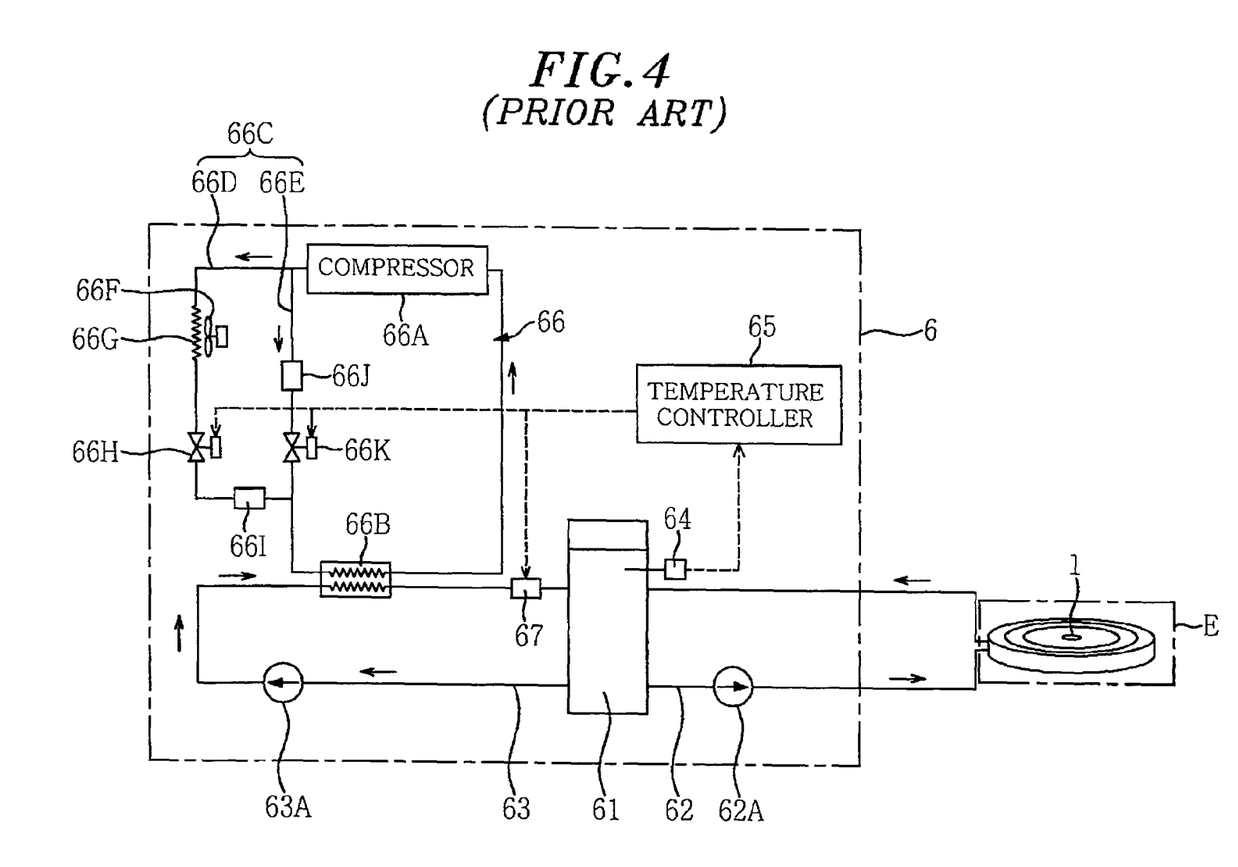
FIG. 4 provides a configuration view of an exemplary cooling device employed in the inspection device of FIG. 3.

As shown in FIGS. 3 and 4, the conventional wafer chuck 1 is provided with a cooling device 6 which cools the heat from the wafer W during the inspection to thereby keep the temperature of the wafer W to be constant. The cooling device 6 has a first cooling liquid circulation path 62 for circulating the cooling liquid between the wafer chuck 1 and a cooling liquid tank 61; a second cooling liquid circulation path 63 for circulating the cooling liquid 61 from the cooling liquid tank 61 to cool or heat it; a temperature detector 64 for detecting the temperature of the cooling liquid within the cooling liquid tank 61; a temperature controller 65 which operates based on the detection result of the temperature detector 64; a temperature control mechanism 66 driven under the control of the temperature controller 65 to cool or heat the cooling liquid which is circulating through the second cooling liquid circulation path 63; and a heater 67 disposed in the second cooling liquid circulation path 63. A first and a second pump 62A and 63A which serve to circulate the cooling liquid are provided in the first and the second cooling liquid circulation path 62 and 63, respectively.

As shown in FIG. 4, the temperature control mechanism 66 includes a compressor 66A; a heat exchanger 66B; and a coolant circulation path 66C interposed between the compressor 66A and the heat exchanger 66B, for circulating a coolant gas therethrough. The coolant circulation path 66C has an outgoing path made up of branch lines 66D and 66E through which the coolant gas flows from the compressor 66A to the heat exchanger 66B; and an incoming path through which the coolant gas returns back to the compressor 66A from the heat exchanger 66B.

Installed on the first branch line 66D is a heat radiator 66G having a cooling fan 66F, and a first electromagnetic valve 66H and an expansion valve 66I are sequentially provided downstream of the heat radiator 66G. The first electromagnetic valve 66H is operated under the control of the temperature controller 65. The coolant gas highly pressurized by the compressor 66A is cooled down and condensed in the heat radiator 66G by the operation of the cooling fan 66F, and is converted into a cooling liquid. The cooling liquid flows into the heat exchanger 66B via the first electromagnetic valve 66H and the expansion valve 66I while they are opened. Then, the cooling liquid is evaporated in the heat exchanger 66B, cooling the cooling liquid in the second cooling liquid circulation path 63, and returns to the compressor 66A.

Furthermore, a depressurization valve 66J and a second electromagnetic valve 66K are sequentially installed in the second branch line 66E in that order from an upstream toward a downstream. The second electromagnetic valve 66K and the heater 67 are operated under the control of the temperature controller 65. The high-temperature and high-pressure coolant gas provided from the compressor 66A is depressurized by the depressurization valve 66J, and is directed into the heat exchanger 66B via the second electromagnetic valve 66K. In the heat exchanger 66B, the high-temperature gas serves to heat the cooling liquid within the second cooling liquid circulation path 63, and then returns to the compressor 66A. If the heating by the heat exchanger is not enough, the heater 67 is operated to complement the insufficient heat efficiency of the heat exchanger 66B. As described, by using the cooling device 6, the cooling liquid of the cooling liquid tank 61 is controlled to reach a certain inspection temperature.

The conventional cooling device 6 can control the temperature of the cooling liquid in the cooling liquid tank 61 within a range from a low temperature (e.g., −65° C.) to a high temperature (from a temperature lower than a boiling point of the cooling liquid to a temperature of several tens of degrees centigrade) by cooling or heating the cooling liquid flowing in the second cooling liquid circulation path 63 by means of the temperature control mechanism 66. However, it is impossible to use a same cooling liquid for both the low temperature and the high temperature range. More specifically, a cooling liquid that can be used within the low temperature range cannot be used within the high temperature range if the level of the high temperature is higher than or equal to the boiling point (e.g., 85° C.) of the cooling liquid observed at a normal pressure. On the contrary, a cooling liquid that can be used at the high temperature of, e.g., 85° C. cannot be used at a low temperature of, e.g., −65° C., because the viscosity of the cooling device becomes excessively high at that low temperature level.

To cope with the above problem, two cooling devices using different cooling liquids may be used for the low and the high temperature range. In this case, however, the cooling jacket of the water chuck 1 needs to be cleaned whenever the cooling devices are replaced. Alternatively, a single cooling device may be used by changing cooling liquids, but the cooling device, along with the cooling jacket of the wafer chuck 1, needs to be cleaned in such case. Therefore, using two kinds of cooling liquids for the low and the high temperature range is not practical.

SUMMARY OF THE INVENTION

In view of the above, the present invention provides a temperature control method and apparatus and a high/low temperature processing system for controlling a temperature of a target object, wherein a conventional temperature control liquid such as a cooling liquid used in a heat absorption process at a low temperature can be used in a heat absorption process at a high temperature as well, whereby a range of heat absorption temperature of the temperature control liquid can be expanded.

In accordance with one aspect of the present invention, there is provided a temperature control apparatus that controls a temperature of a target object by a heat exchange between a temperature control liquid and the target object. The apparatus includes a pressurizing unit that pressurizes the temperature control liquid to increase a boiling point thereof; a heating unit that increases a temperature of the temperature control liquid to become higher than or equal to a boiling point of the temperature control liquid observed at a normal pressure; and a heat exchanging unit that exchanges heat between the target object and the temperature control liquid whose temperature has been increased to become higher than or equal to the boiling point of the temperature control liquid observed at the normal pressure.

In accordance with another aspect of the present invention, there is provided a high/low temperature processing system that controls a temperature of a target object by circulating one type of cooling liquid into and out of a processing unit to perform a heat exchange between the cooling liquid and the target object when the processing unit performs a specific process on the target object in a high temperature or in a low temperature range. The system includes a pressurizing/heating device that increases a boiling point of the cooling liquid, heats the cooling liquid whose boiling point has been increased, and circulates the cooling liquid into and out of the processing unit; and a cooling device that cools the cooling liquid, and circulates the cooing liquid into and out of the processing unit. Herein, the pressurizing/heating device is used while the specific process is being performed on the target object in the high temperature range, and the cooling device is used while the specific process is being performed on the target object in the low temperature range.

It is preferable that the pressurizing/heating device includes a receptacle that stores the cooling liquid therein; a pressurizing unit that pressurizes an inside of the receptacle; and a heating unit that heats the cooling liquid is disposed in a circulation path.

Further, it is preferable that the pressurizing/heating device includes a cooling device that cools the cooling liquid is disposed in a circulation path.

Further, it is preferable that the pressurizing unit is a gas supply source that supplies a compressed gas into the receptacle via a gas line.

Further, it is preferable that a pressure control unit for controlling a pressure of the compressed gas is provided in the gas line.

Further, it is preferable that a gas line pressure detecting unit that detects a pressure of the compressed gas is installed in the gas line at a position upstream of the pressure control unit.

Further, it is preferable that the receptacle includes a second pressure detecting unit that detects an internal pressure of the receptacle; and a safety valve that maintains the internal pressure of the receptacle at a set level.

Further, it is preferable that the circulation path is branched off from each of an inlet port and an outlet port of the processing unit into a branched path toward the cooling device and another branched path toward the pressurizing/heating device, and a first and a second opening/closing valve whose operations are opposite from each other are disposed in each of the branched paths, and an inlet and an outlet is installed at each of the first opening/closing valves that are installed in the branched paths that are extended toward the inlet port of the processing unit, the inlet and the outlet being arranged in a direction reverse to a direction in which the cooling liquid flows.

Further, it is preferable that a temperature detecting unit and a third pressure detecting unit are provided in a circulation path extended toward an inlet port of the processing unit.

In accordance with still another aspect of the present invention, there is provided a temperature control method for controlling a temperature of a target object by a heat exchange between a temperature control liquid and the target object. The method includes increasing a boiling point of the temperature control liquid by pressurizing the temperature control liquid; increasing a temperature of the temperature control liquid to become higher than or equal to a boiling point of the temperature control liquid observed at a normal pressure; and performing a heat exchange between the target object and the temperature control liquid whose temperature has been increased to become higher than or equal to the boiling point of the temperature control liquid observed at the normal pressure.

It is preferable that the temperature control liquid is pressurized by supplying a compressed gas into a receptacle that stores therein the temperature control liquid.

Further, it is preferable that the heat exchange is carried out in a processing unit that performs a specific process on the target object.

Further, it is preferable that the temperature control liquid is circulated between the receptacle and the processing unit.

Further, it is preferable that the temperature control liquid, whose temperature has been increased by the heat exchange with the target object, is cooled down and returned back into the receptacle.

Further, it is preferable that the temperature control liquid, which is used as a cooling medium in a low temperature range, is also used in a high temperature range.

In accordance with the aspects of the present invention, there is provided a temperature control method and apparatus and a high/low temperature processing system for controlling a temperature of a target object in which a temperature control liquid such as a conventional cooling liquid used for a heat absorption process in a low temperature range can also be used for a heat absorption process in a high temperature range, thereby expanding the absorption temperature range of the temperature control liquid such as the conventional cooling liquid.

BRIEF DESCRIPTION OF THE DRAWINGS

The objects and features of the present invention will become apparent from the following description of the accompanying drawings, in which.

DETAILED DESCRIPTION OF THE EMBODIMENTS

Figure 1:
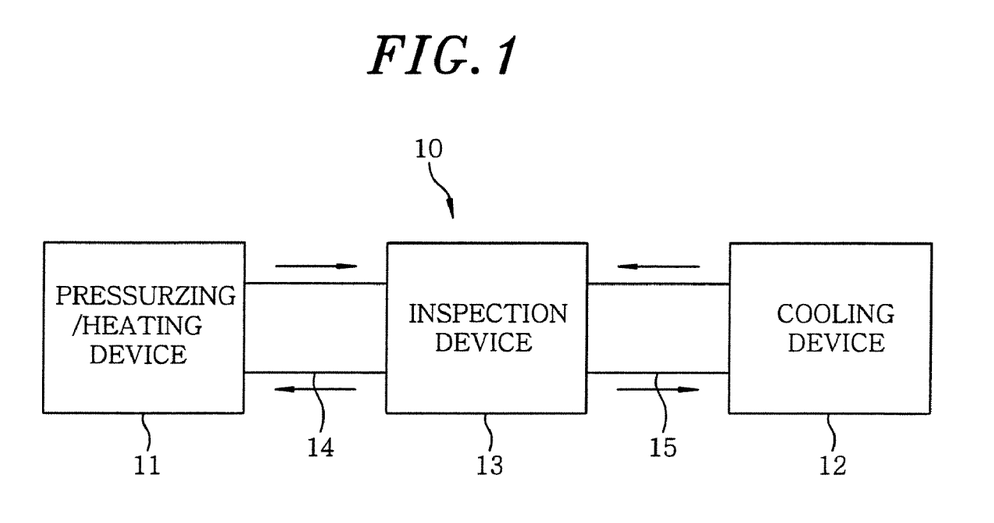
FIG. 1 shows a configuration view of a high/low temperature processing system in accordance with an embodiment of the present invention.
Figure 2:
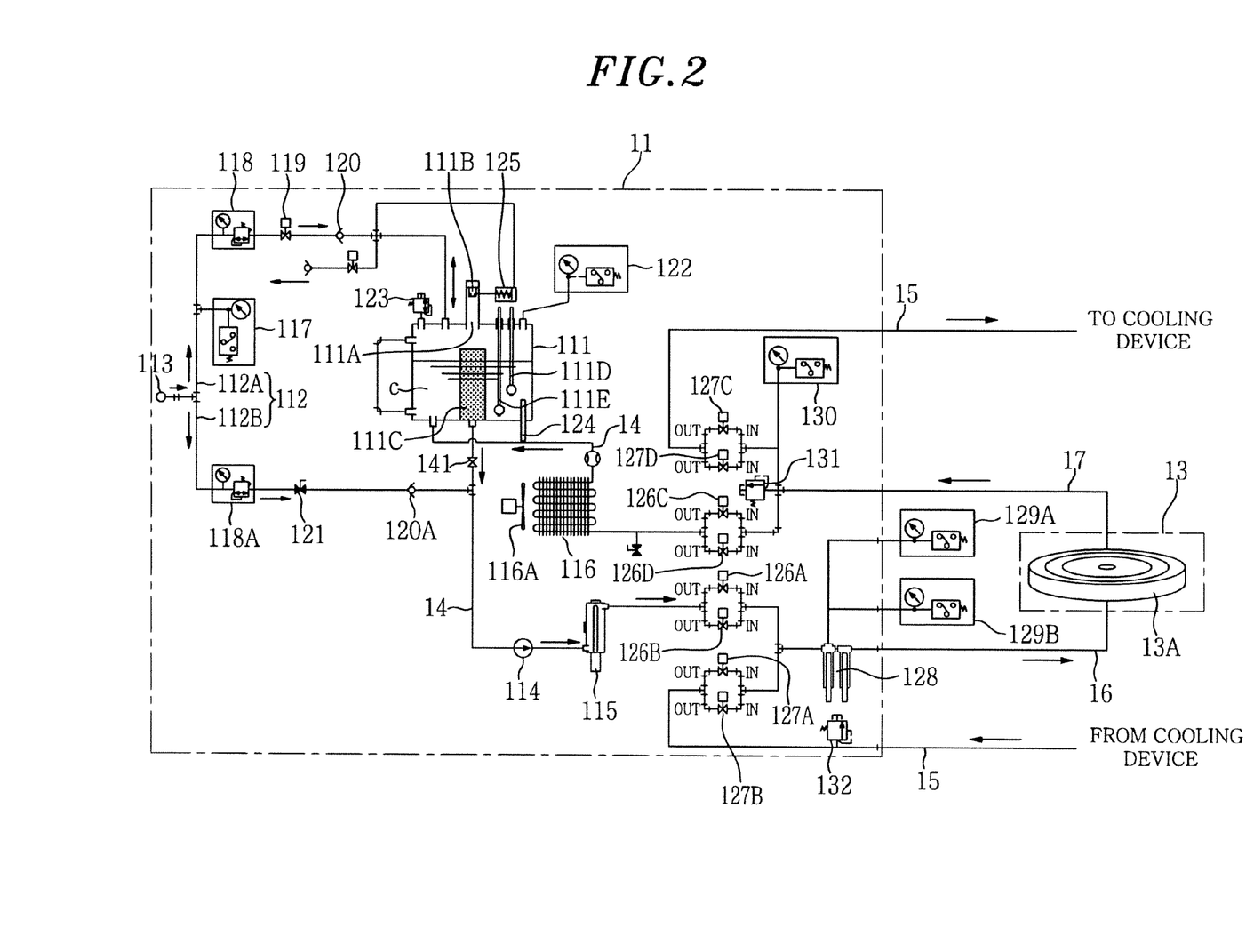
FIG. 2 presents a fluid circuit diagram to describe a pressurizing/heating device of the high/low temperature processing system of FIG. 1.

Hereinafter, an embodiment of the present invention will be described with reference to the accompanying drawings (especially FIGS. 1 and 2) which form a part hereof. FIG. 1 is a block diagram showing a high/low temperature processing system in accordance with the embodiment of the present invention, and FIG. 2 is a fluid circuit diagram of a pressuring/heating unit of the high/low temperature processing system of FIG. 1.

In the present embodiment, a temperature control apparatus for controlling a temperature of a target object is configured by a high/low temperature processing system 10 illustrated in FIG. 1. As shown therein, this high/low temperature processing system 10 includes a pressurizing/heating device 11 for pressurizing and heating a cooling liquid serving as a temperature control liquid in order to use it in a high temperature range (at a temperature, e.g., 85° C.; within a range, e.g., from 50° C. to 85° C. which is higher than or equal to a boiling point of the cooling liquid observed at a normal pressure, i.e., 100 kPa); a cooling device 12 for cooling the liquid in order to use it in a low temperature range (lower than 0° C.; e.g., −65° C.); and a processing apparatus (e.g., an inspection device 13) for performing a desired process on the target object (e.g., a wafer). The cooling liquid from the pressurizing/heating device 11 or the cooling device 12 absorbs heat generated from the wafer when the inspection device 13 performs a high temperature inspection or a low temperature inspection of the wafer, thereby cooling the wafer.

The pressurizing/heating device 11 is connected to the inspection device 13 via a first circulation path 14, as shown in FIG. 1, and is used when an inspection is performed in the high temperature range. The cooling device 12 is connected to the inspection device 13 via a second circulation path 15, as shown in FIG. 1, and is used when an inspection is performed in the low temperature range. In the present embodiment, the cooling liquid circulated between the pressurizing/heating device 11 and the inspection device 13 is same as that circulated between the cooling device 12 and the inspection device 13. Herein, a conventional known cooling device can be utilized as the cooling device 12. Since one and the same cooling liquid circulates through the inspection device 13, it is not required to clean the circulation paths of the inspection device 13. Further, the inspection in the high temperature range and the inspection in the low temperature range (hereinafter, simply referred to as a "low temperature inspection") can be rapidly switched from each other, resulting in a considerable increase of throughput of the inspection.

Now, the pressurizing/heating device 11 used in the present embodiment will be explained with reference to FIG. 2. As shown therein, the pressurizing/heating device 11 includes a cooling liquid tank 111 for storing therein a cooling liquid C; a gas supply source 113 connected to the cooling liquid tank 111 via a line 112; a pump 114 disposed in an outgoing path of the first circulation path 14 for circulating the cooling liquid between the cooling liquid tank 111 and the wafer chuck 13A of the inspection device 13; a heater 115 disposed downstream of the pump 114; and a heat radiator 116 disposed in an incoming path of the first circulation path for returning the cooling liquid from the wafer chuck 13A to the cooling liquid tank 111, wherein the heat radiator 116 has a cooling fan 116A.

The line 112 diverges into a first branch line 112A and a second branch line 112B at a downstream position of the gas supply source 113, as illustrated in FIG. 2. The first branch line 112A is connected to the top surface of the cooling liquid tank 111. The second branch line 112B is connected to the outgoing path of the first circulation path 14 at a position between the cooling liquid tank 111 and the heater 115.

The gas supply source 113 supplies the cooling liquid tank 111 with dry air pressurized to a specific pressure level (e.g., 0.6 to 1.0 MPa) (hereinafter, simply referred to as a "compressed air"). Thus, the internal pressure of the cooling liquid tank 111 is kept at a higher pressure level (e.g., 0.2 MPa) than that of the outside, so that the boiling point of the cooling liquid C is increased. The heater 115 heats the cooling liquid C, whose boiling point has been raised, up to a temperature level that falls within the high temperature range, and by absorbing heat from the wafer generated during the high temperature inspection at the wafer chuck 13A, the wafer can be cooled down.

In the first branch line 112A of the line 112, a pressure detector 117, a pressure controller 118, an electromagnetic valve 119 and a check valve 120 are installed in that order from an upstream toward a downstream. The pressure detector 117 detects the pressure of the compressed air inside the line 112A and monitors it such that the internal pressure of the line extended from the gas supply source 113 to the pressure controller 118 is kept within a specific temperature range (e.g., 0.6 to 1.0 MPa). With the electromagnetic valve 119 opened, the pressure controller 118 reduces the pressure of the compressed air provided from the gas supply source 113 down to, e.g., 0.2 Pa, and supplies it into the cooling liquid tank 111. Since the cooling liquid tank 111 is maintained at a pressure level higher than a normal pressure, the boiling point of the cooling liquid C is increased, as mentioned before. As the cooling liquid C, a fluorine-based coolant such as Novec HFE-7200 (which is a product manufactured by 3M) having a boiling point of 76° C. at a normal pressure. Under the pressure of 0.2 MPa, a boiling point of the Novec HFE-7200 is increased up to about 110° C., and it can still remain in the liquid state when heated by the heater 115 up to a high temperature of, e.g., 85° C. at which the inspection at the wafer chuck 13A is performed.

On the second branch line 112B of the line 112, a pressure controller 118A, a manual valve 121, a check valve 120A are installed in that order from an upstream toward a downstream. The pressure controller 118A reduces the pressure of the compressed air provided from the gas supply source 113 down to, e.g., 0.05 MPa. The manual valve 121 is opened when the cooling liquid C is discharged via the first circulation path 14. By opening the manual valve 121, the second branch line 112B is allowed to communicate with the first circulation path 14, whereby the cooling liquid C is purged from the first circulation path 14 by the compressed air. At this time a manual valve 141 is closed to prevent the cooling liquid C from returning to the cooling liquid tank 111.

Disposed on the top surface of the cooling liquid tank 111 are a pressure detector 122 and a safety valve 123. The pressure detector 122 detects the internal pressure of the cooling liquid tank 111. The safety valve 123 is operated when the internal pressure of the cooling liquid tank 111 exceeds 0.25 MPa to keep the inside of the cooling liquid tank 111 at a pressure level of about 0.2 MPa. Further, a temperature detector 124 is attached on the bottom surface of the cooling liquid tank 111. The heat radiator 116 to be described later is controlled according to a detection result of the temperature detector 124 to keep the temperature of the cooling liquid C at a desired level.

A supply unit 111A for supplying the cooling liquid C is provided at the top surface of the cooling liquid tank 111, and a cap 111B is attached to the supply unit 111A. The cap 111B is held in place by a locking cylinder 125, and can be opened or closed only when the internal pressure of the cooling liquid tank 111 is at the normal pressure level. Furthermore, a filter 111C, which serves to remove foreign substances from the cooling liquid C, is disposed inside the cooling liquid tank 111. The cooling liquid C, from which the foreign substance have been removed, is discharged into the outgoing path of the first circulation path 14. Further, liquid surface detectors 111D and 111E for detecting an upper and a lower limit of the liquid surface are installed at the cooling liquid tank 111, and the cooling liquid is refilled in response to the detection results of the liquid surface detectors 111D and 111E.

Now, a mechanism of switching between the pressurizing/heating device 11 and the cooling device 12 to be connected to the wafer chuck 13A will be explained. As illustrated in FIG. 2, an inlet line 16 functioning as a circulation path is connected to an inlet port of the wafer chuck 13A, and the outgoing paths of the first and the second circulation path 14 and 15 join at the inlet line 16. Further, an outlet line 17 functioning as a circulation path is connected to an outlet port of the wafer chuck 13A, and the incoming paths of the first and the second circulation paths 14 and 15 diverges from the outlet line 17.

In the outgoing path of the first circulation path 14, a pair of first electromagnetic valves 126A and 126B are connected in parallel, and on the incoming path of the first circulation path 14, a pair of second electromagnetic valves 126C and 126D are connected in parallel. These electromagnetic valves 126A to 126D are opened and closed synchronously with each other. Further, in the outgoing path of the second circulation path 15, a pair of first electromagnetic valves 127A and 127B are connected in parallel, and on the incoming path of the second circulation path 15, a pair of second electromagnetic valves 127C and 127D are connected in parallel. These electromagnetic valves 127A to 127D are opened and closed synchronously with each other. The first and the second electromagnetic valves 126A to 126D of the first circulation path 14 are opened and closed in a manner reverse to the first and the second electromagnetic valves 127A to 127D of the second circulation path 15, thus allowing the pressurizing/heating device 11 and the cooling device 12 to be selectively connected to the wafer chuck 13A.

Moreover, an inlet and an outlet of each of the first electromagnetic valves 126A and 126B in the outgoing path of the first circulation paths 14 and the first electromagnetic valves 127A and 127B in the outgoing path of the second circulation path 15 are provided in directions opposite to the respective circulation paths. Since poppet valves are used as the first electromagnetic valves 126A, 126B, 127A and 127B, the cooling liquid C may be leaked out if a pressure is applied from the outlet side of the valves. However, by installing the inlet and the outlet of each of the electromagnetic valves 126A and 126B of the first circulation path 14 and the electromagnetic valves 127A and 127B of the second circulation path 15 in the reverse directions as described above, the cooling liquid C of the first circulation path 14 is prevented from being leaked out into the second circulation path 15 when the pressurizing/heating device 11 is operated. Likewise, the cooling liquid C of the second circulation path 15 is prevented from being leaked out into the first circulation path 14 when the cooling device 12 is operated.

Moreover, a temperature detector 128 is installed in the inlet line 16 of the wafer chuck 13A to detect the temperature of the cooling liquid C flown into the wafer chuck 13A. According to the detection result thereof, the heater 115 and the cooling fan 116A are controlled to maintain the temperature of the cooling liquid C to be within a desired temperature range. Further, pressure detectors 129A and 129B are connected to the inlet line 16 to detect the pressure of the cooling liquid C flown into the wafer chuck 13A. Based on the detection results of the pressure detectors 129A and 129B, it is monitored whether or not the pressure of the cooling liquid C is kept within a desired pressure range.

Furthermore, a pressure detector 130 is connected to the outlet line 17, in which a safety valve 131 is installed as well. The pressure detector 130 monitors the pressure of the cooling liquid C flown from the wafer chuck 13A. If the pressure of the cooling liquid C is found to be excessively high, the safety valve 131 is operated to discharge the cooling liquid C. Further, a safety valve 132 is installed upstream of the first electromagnetic valves 127A and 127B of the outgoing path of the second circulation path 15. If the pressure of the cooling liquid C within this outgoing path becomes excessively high, the safety valve 132 is operated such that the pressure of the cooling liquid C is maintained within a desired pressure range.

Hereinafter, a method for controlling the temperature of the target object, which is performed by the high/low temperature processing system 10 shown in FIG. 2, will be explained in accordance with an embodiment of the present invention. Here, the inspection of the wafer at a high temperature of 85° C. (hereinafter, simply referred to as a "high temperature inspection") will be first explained. When performing the high temperature inspection, the pressurizing/heating device 11 is operated to be connected to the wafer chuck 13A, and the cooling liquid C pressurized and heated by the pressurizing/heating device 11 is circulated through the first circulation path 14. At this time, the first and the second electromagnetic valves 127A to 127D of the second circulation path 15 are all closed, and the cooling device 12 is isolated from the wafer chuck 13A.

Specifically, if the electromagnetic valve 119 of the first branch line 112A of the line 112 is opened, a compressed air is supplied from the gas supply source 113 into the cooling liquid tank 111. Here, the compressed air of a specific pressure (e.g., 0.6 to 1.0 MPa) from the gas supply source 113 is depressurized to a preset pressure level (e.g., 0.2 MPa) in the first branch line 112A by the operation of the pressure controller 118, and then is supplied into the cooling liquid tank 111. The cooling liquid tank 111 is filled with the compressed air of about 0.2 MPa, and the boiling point of the cooling liquid C is increased up to a temperature adequate for that pressure.

The pump 114, the heater 115 and the heat radiator 116 of the first circulation path 14 are operated in a manner synchronous to the electromagnetic valve 119 of the first branch line 112A. At this time, the first and the second electromagnetic valves 126A to 126D are opened, whereby the cooling liquid tank 111 and the wafer chuck 13A are allowed to communicate with each other and the pressurizing/heating device 11 is connected to the wafer chuck 13A. Accordingly, the cooling liquid C whose boiling point has been raised in the cooling liquid tank 111 is circulated between the cooling liquid tank 111 and the wafer chuck 13A via the first circulation path 14 by the operation of the pump 114. Further, in the cooling liquid tank 111, foreign substances contained in the cooling liquid C are removed by the filter 111C, and the cooling liquid C from which the foreign substances have been removed is then circulated.

Since it is configured such that the cooling liquid C is introduced from the outlet port of each of the first electromagnetic valves 126A and 126B of the first circulation path 14 and the first electromagnetic valves 127A and 127B of the second circulation path 15, the first circulation path 14 can be completely isolated from the second circulation path 15. Thus, when the pressurizing/heating device 11 is operated, the high-pressure cooling liquid C can be prevented from being leaked out from the first circulation path 14 into the second circulation path 15. Likewise, when the cooling device 12 is operated, the cooling liquid C can be prevented from being leaked out from the second circulation path 15 into the first circulation path 14.

As described above, by completely isolating the first circulation path 14 from the second circulation path 15, the cooling liquid C is circulated between the pressurizing/heating device 11 and the wafer chuck 13A to be gradually heated by the heater 115. Since the boiling point of the cooling liquid C is increased to become higher than a temperature level at which the high temperature inspection is carried out, it becomes possible to heat the cooling liquid C up to the temperature adequate for the high temperature inspection.

At this time, the temperature of the cooling liquid C is monitored by the temperature detector 128. If the temperature of the cooling liquid C does not reach the temperature level adequate for the high temperature inspection, the heating efficiency of the heater 115 is increased in response to a signal from the temperature detector 128. Thus, the cooling liquid C is allowed to reach the adequate temperature in a shorter period of time. On the other hand, if the temperature of the cooling liquid C exceeds the adequate temperature level, the cooling fan 116A is operated in response to a signal from the temperature detector 128. Thus, the temperature of the cooling liquid C is restored back to the adequate temperature level.

If the temperature of the cooling liquid C reaches the adequate temperature level for the high temperature inspection, a wafer is loaded on the wafer chuck 13A, and the inspection of the wafer is started. During the inspection, heat from the wafer is absorbed by the cooling liquid C. Thus, the wafer can be maintained at a constant temperature level, and the inspection can be carried out with a higher reliability. The cooling liquid C is flown out from the wafer chuck 13A with its temperature increased due to the absorption of the heat from the wafer. The pressure of the cooling liquid C is monitored by the pressure detector 130 before the cooling liquid C reaches the second electromagnetic valves 126C and 126D. If the pressure of the cooling liquid C exceeds a specific pressure level, the safety valve 131 is operated to discharge some of the cooling liquid C, whereby the pressure of the cooling liquid C is returned to a normal pressure level.

The cooling liquid C whose temperature has been raised at the wafer chuck 13A reaches the heat radiator 116 via the second electromagnetic valves 126C and 126D. In the heat radiator 116, the cooling liquid C is cooled down by the operation of the cooling fan 116A, and is returned back into the cooling liquid tank 111. If the cooling efficiency of the heat radiator 116 is not sufficient, and thus the temperature of the cooling liquid C in the cooling liquid tank 111 is gradually increased over a certain temperature level, an overheating alarm is produced in response to a signal from the temperature detector 124 to stop the whole operation. Furthermore, if the internal pressure of the cooling liquid tank 111 is increased over a certain pressure level because of the evaporation of the cooling liquid C and the like, the safety valve 123 is operated. Thus, the internal pressure of the cooling liquid tank 11 is restored to a normal pressure level.

Upon the completion of the above-described high temperature inspection, the pressurizing/heating device 11 is stopped. Accordingly, the first and the second electromagnetic valves 126A to 126D of the first circulation path 14 are closed, so that the pressurizing/heating device 11 becomes disconnected from the wafer chuck 13A. Thereafter, the cooling device 12 is operated to perform an inspection of the wafer at a low temperature of, e.g., −65° C. (hereinafter, simply referred to as a "low temperature inspection"), and the first and the second electromagnetic valves 127A to 127D of the second circulation path 15 are opened. Thus, the cooling device 12 is connected to the wafer chuck 13A. The cooling liquid C is cooled down to a specific temperature level as in prior art. While circulating the cooling liquid C in the wafer chuck 13A, the low temperature inspection is carried out.

In accordance with the embodiment of the present invention as described above, the high/low temperature processing system 10 includes the pressurizing/heating device 11 which serves to circulate the cooling liquid C into the wafer chuck 13A after increasing its boiling point and heating it thereafter; and the cooling device 12 which serves to circulate the cooling liquid C after cooling it. When a wafer inspection is performed at a high temperature, the pressurizing/heating device 11 is used, whereas the cooling device 12 is used when the wafer inspection is carried out at a low temperature.

Therefore, when processing the wafer at the high temperature, the cooling liquid C same as that used at the low temperature can be reused in the pressurizing/heating device 11, in which the boiling point of the cooing liquid C is increased by being pressurized. Then, the cooling liquid C whose boiling point has been increased is circulated in the wafer chuck 13A after being heated. That is, since the conventional cooling liquid same as that used in the heat absorption process at the low temperature can be also used for the heat absorption process at the high temperature, the heat absorption temperature range of the cooling liquid C can be expanded. Therefore, when switching between the high temperature inspection and the low temperature inspection, the cooling liquid left inside the wafer chuck 13A can be reused without being changed. In this manner, the inspection throughput can be enhanced.

Moreover, in accordance with the present embodiment, the pressurizing/heating device 11 includes the cooling liquid tank 111 for storing the cooling liquid therein; the gas supply source 113 for supplying the compressed air which serves to pressurize the inside of the cooling liquid tank 111; and the heater 115 for heating the cooling liquid C, disposed in the first circulation path 14's outgoing path which extends from the cooling liquid tank 111 to the wafer chuck 13. With this configuration, the boiling point of the cooling liquid C can be increased, and the cooling liquid C can be heated up to the temperature adequate for the high temperature inspection.

Furthermore, in accordance with the present embodiment, since the pressurizing/heating device 11 has the cooling fan 116A for cooling the cooling liquid C, disposed in the first circulation path 14's incoming path extended from the wafer chuck 13A to the cooling liquid tank 111, a temperature change of the cooling liquid C in the cooling liquid tank 111 can be restrained. In addition, since the pressure controller 118 for controlling the pressure of pressurized air is installed in the first branch line 112A of the line 112 connected between the gas supply source 113 and the cooling liquid tank 111, the boiling point of the cooling liquid C can be appropriately controlled to be within a specific temperature range as required.

Further, since the pressure detector 117 for detecting the pressure of pressurized air is disposed in the first branch line 112A of the line 112 upstream of the pressure controller 118, the pressure detector 117 can detect the original pressure of the compressed air, thus helping the operation of the pressure controller 117. Further, since the cooling liquid tank 111 has the pressure detector 122 for detecting the internal pressure of the cooling liquid tank 111 and the safety valve 123 for keeping the internal pressure of the cooling liquid tank at a specific set value, the inside of the cooling liquid tank 111 can be maintained at a constant pressure level, whereby the boiling point of the cooling liquid C can be stabilized.

Further, in accordance with the present embodiment, the circulation path of the cooling liquid is branched off from each of the inlet and the outlet of the wafer chuck 13A into the first and the second circulation path 14 and 15 respectively connected to the pressurizing/heating device 11 and the cooling device 12. In addition to this, the first and the second electromagnetic valves 126A to 126D, whose operations are opposite to each other, are installed in the first circulation path 14, and the first and the second electromagnetic valves 127A to 127D, whose operations are opposite to each other, are installed in the second circulation path 15. Further, the inlets and the outlets of the first electromagnetic valves 126A and 126B of the first circulation path 14 and the first electromagnetic valves 127A and 127B of the second circulation path 15 are installed in the wafer chuck 13A in directions reverse to the directions in which the cooling liquid flows in the circulation paths.

With this configuration, by using the first and the second electromagnetic valves 126A to 126D and 127A to 127D, the pressurizing/heating device 11 and the cooling device 12 can be certainly switched from each other. Further, the outgoing paths of the first and the second circulation path 14 and 15 can be completely isolated from each other, whereby a leakage of the cooling liquid C from the first circulation path 14 into the second circulation path 15 or vice versa can be prevented. Moreover, since the temperature detector 128 and the pressure detectors 129A and 129B are installed in the inlet line 16 of the wafer chuck 13A, the temperature and the pressure of the cooling liquid C flown into the wafer chuck 13A can be kept at constant levels.

Further, though the present embodiment has been described for the case of applying the high/low temperature processing system to the inspection device, the present invention should not be construed to be limited thereto. That is, the present invention can also be applied to any system that controls a temperature of a target object by using a temperature control liquid such as a cooling liquid within a high and/or a low temperature range. In this case, if necessary, the present invention can be modified in design.

The present invention can be appropriately employed in various temperature control methods and apparatuses for controlling a temperature of a target object by using a high/low temperature processing system that controls the temperature of the target object both in the high temperature range and in the low temperature range.

While the invention has been shown and described with respect to the embodiments, it will be understood by those skilled in the art that various changes and modifications may be made without departing from the scope of the invention as defined in the following claims.

What is claimed is:
1. A temperature processing system that controls a temperature of a target object by circulating one type of cooling liquid into and out of a processing unit to perform a heat exchange between the one type of cooling liquid and the target object when the processing unit performs a specific process on the target object in a high temperature or in a low temperature range, the system comprising:
   a cooling device provided separately from and in fluid communication with the processing unit, the cooling device cools the cooling liquid, and circulates the one type of cooling liquid into and out of the processing unit; and
   a cooling liquid processing device provided separately from and in fluid communication with the processing unit, the cooling liquid processing device increases a boiling point of the cooling liquid by pressurizing the cooling liquid, heats the cooling liquid whose temperature has been increased to become higher than a boiling point of the cooling liquid observed at the atmospheric pressure and lower than the increased boiling point such that the cooling liquid remains in a liquid state, and circulates the one type of cooling liquid whose temperature has been increased to become higher than the boiling point of the cooling liquid observed at the atmospheric pressure and lower than the increased boiling point into and out of the processing unit, the one type of cooling liquid remaining in the liquid state,
   wherein only the cooling liquid processing device circulates the one type of cooling liquid into and out of the processing unit while the specific process is being performed on the target object in the high temperature range,
   wherein the cooling device is provided separately from the cooling liquid processing device, and only the cooling device circulates the one type of cooling liquid into and out of the processing unit while the specific process is being performed on the target object in the low temperature range, and
   wherein the cooling liquid that is circulated by the cooling device through the processing unit is the same cooling liquid that is circulated by the cooling liquid processing device through the processing unit.

2. The temperature processing system of claim 1, wherein the cooling liquid processing device includes:
   a receptacle that stores the cooling liquid therein;
   a pressurizing unit that pressurizes an inside of the receptacle; and
   a heating unit that heats the cooling liquid disposed in a circulation path.

3. The temperature processing system of claim 2, wherein the cooling liquid processing device includes:
   a cooling device that cools the cooling liquid disposed in the circulation path.

4. The temperature processing system of claim 2, wherein the pressurizing unit is a gas supply source that supplies a compressed gas into the receptacle via a gas line.

5. The temperature processing system of claim 4, wherein a pressure control unit for controlling a pressure of the compressed gas is provided in the gas line.

6. The temperature processing system of claim 5, wherein a gas line pressure detecting unit that detects a pressure of the compressed gas is installed in the gas line at a position upstream of the pressure control unit.

7. The temperature processing system of claim 2, wherein the receptacle includes:
   a pressure detecting unit that detects an internal pressure of the receptacle; and
   a safety valve that maintains the internal pressure of the receptacle at a set level.

8. The temperature processing system of claim 2, wherein the circulation path is branched off from each of an inlet port and an outlet port of the processing unit into a first branched path toward the cooling device and a second branched path toward the cooling liquid processing device, and a first valve and a second valve whose operations are opposite from each other are disposed in the first and the second branched path, respectively and each of the first valve and the second valve that are installed in the first and second branched path branched off from the inlet port and the outlet port of the processing unit has an inlet port and an outlet port, and
   wherein the inlet port and the outlet port of said each of the first valve and the second valve are arranged in a direction reverse to a direction in which the cooling liquid flows such that the cooling liquid flows into the outlet port of said each of the first valve and the second valve and is discharged through the inlet port of said each of the first valve and the second valve into the processing unit.

9. The temperature processing system of claim 1, wherein a temperature detecting unit and a pressure detecting unit are provided in a circulation path extended toward an inlet port of the processing unit.

* * * * *